(12) United States Patent
Tian et al.

(10) Patent No.: US 7,965,894 B2
(45) Date of Patent: Jun. 21, 2011

(54) METHOD FOR DETECTING ALTERATIONS IN PRINTED DOCUMENT USING IMAGE COMPARISON ANALYSES

(75) Inventors: Yibin Tian, Menlo Park, CA (US); Wei Ming, Cupertino, CA (US)

(73) Assignee: Konica Minolta Systems Laboratory, Inc., San Mateo, CA (US)

( * ) Notice: Subject to any disclaimer, the term of this patent is extended or adjusted under 35 U.S.C. 154(b) by 64 days.

(21) Appl. No.: 12/495,749

(22) Filed: Jun. 30, 2009

(65) Prior Publication Data
US 2010/0329576 A1 Dec. 30, 2010

(51) Int. Cl.
*G06K 9/68* (2006.01)
(52) U.S. Cl. .................. 382/218; 382/181; 382/219
(58) Field of Classification Search .......... 382/181, 382/218, 219
See application file for complete search history.

(56) References Cited

U.S. PATENT DOCUMENTS

| | | | |
|---|---|---|---|
| 6,212,504 B1 | 4/2001 | Hayosh | |
| 6,289,108 B1 * | 9/2001 | Rhoads | 382/100 |
| 6,748,102 B2 | 6/2004 | Prakash | |
| 7,043,052 B2 | 5/2006 | Rhoads | |
| 7,080,041 B2 | 7/2006 | Nagel | |
| 7,239,734 B2 | 7/2007 | Alattar et al. | |
| 7,280,696 B2 * | 10/2007 | Zakrzewski et al. | 382/218 |
| 7,330,563 B2 | 2/2008 | Rhoads | |
| 7,394,573 B1 | 7/2008 | Goldberg et al. | |
| 7,650,047 B2 * | 1/2010 | Jin et al. | 382/294 |
| 2003/0228058 A1 * | 12/2003 | Xie et al. | 382/218 |
| 2006/0109515 A1 | 5/2006 | Zhao et al. | |
| 2007/0081694 A1 | 4/2007 | Ryan, Jr. | |
| 2008/0177799 A1 | 7/2008 | Wilson | |
| 2008/0216149 A1 | 9/2008 | Rhoads | |
| 2008/0310736 A1 * | 12/2008 | Chattopadhyay et al. | 382/218 |
| 2009/0067666 A1 | 3/2009 | Zhao et al. | |

OTHER PUBLICATIONS

Yu et al., "Image Authentication in Print-and-scan Scenario", Intelligent Information Hiding and Multimedia Signal Processing, Third International Conference, Nov. 2007, pp. 295-298, vol. 1.
Liu et al., "Binary Image Authentication using Zernike Moments", Image Processing, IEEE International Conference, Sep. 16, 2007-Oct. 19, 2007, pp. I-385-I-388.

* cited by examiner

*Primary Examiner* — Bhavesh M Mehta
*Assistant Examiner* — Stephen R Koziol
(74) *Attorney, Agent, or Firm* — Chen Yoshimura LLP (57) ABSTRACT

A document alteration detection method compares a target image with an original image using a two-step process. In the first step, the original and target images are divided into connected image components and their centroids are obtained, and the centroids of the image components in the original and target images are compared. Each centroid in the target image that is not in the original image is deemed to represent an addition, and each centroid in the original image that is not in the target image is deemed to represent a deletion. In the second step, sub-images containing the image components corresponding to each pair of matching centroids in the original and target images are compared to detect any alterations.

20 Claims, 5 Drawing Sheets

> Either party may terminate this Agreem
> the event of termination, Client shall pa
> ied up to the date of termination. In the
> tween the parties of this Agreement, the
> other relief, to a reasonable sum for attor
>
> _______________   _______________
> Date

Fig. 3a

> Either party may terminate this Agreem
> the event of termination, Client shall pa
> ied up to the date of termination. In the
> tween the parties of this Agreement, the
> other relief, to a reasonable sum for attor
>
> _______________   *01/12/2008*
> Date

Fig. 3b

Either party may terminate this Agreem
the event of termination, Client shall pa
ied up to the date of termination. In the 
tween the parties of this Agreement, the
other relief, to a reasonable sum for attor _______________   _______________
Date

Fig. 3c

Either party may terminate this Agreem
the event of termination, Client shall pa
ied up to the date of termination. In the 
tween the parties of this Agreement, the
other relief, to a reasonable sum for attor _______________   01/12/2008
Date

Fig. 3d

Either party may terminate this Agreem
the event of termination, Client shall pa
ted up to the date of termination. In the t
tween the parties of this Agreement, the
ther relief, to a reasonable sum for atto 01/12/2008
Date

METHOD FOR DETECTING ALTERATIONS IN PRINTED DOCUMENT USING IMAGE COMPARISON ANALYSES

BACKGROUND OF THE INVENTION

1. Field of the Invention

This invention relates to a method for detecting alterations in a printed document by comparing a scanned image of the document and an original digital version of the document. In particular, it relates to a two-step image comparison method that detects and compares centroids of connected image components as a first step.

2. Description of Related Art

A closed-loop process refers to printing an original digital document (which may include text, graphics, images, etc.), using the printed hardcopy of the document such as distributing it, copying it, etc., and then scanning a hardcopy of the document back into digital form. Authenticating a scanned digital document refers to determining whether the scanned document is an authentic copy of the original digital document, i.e., whether the document has been altered while it was in the hardcopy form. Various types of document authentication and alteration detection methods have been proposed. A goal in many document authentication methods is to detect what the alterations (additions, deletions) are. One type of document authentication method performs an image comparison of the scanned document with the original digital document. This is sometimes referred to as a pixel-based alteration detection method. In another type of document authentication method, data representing or relating to the document content are encoded in barcodes, and the barcodes are printed on the document itself to assist in document authentication later.

In conventional pixel-based alteration detection methods, the original digital image and the scanned image are compared pixel-by-pixel to determine whether there are alterations in the scanned image. The high spatial resolution of both the printer and the scanner result in high resolution scanned images. Exhaustive image comparison processing of the whole image in a conventional alteration detection method is computationally intensive.

SUMMARY

The present invention is directed to an improved method for authenticating a document by performing an image comparison of the scanned document with the original digital document.

An object of the present invention is to provide an alteration detection method based on image comparison that has improved performance.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a data processing apparatus for detecting alterations between an original image and a target image, the original and target images being binary bitmap images, the method including: (a) extracting connected image components from the original and target images; (b) calculating a centroid for each of the extracted connected image components in the original and target images; (c) comparing all centroids of the original image and all centroids of the target image to determine whether each centroid of the original image has a matching centroid of the target image, and whether each centroid of the target image has a matching centroid of the original image; (d) for each centroid of the original image that does not have a matching centroid in the target image, identifying the corresponding connected image component of the original image as a deleted connected image component; (e) for each centroid of the target image that does not have a matching centroid in the original image, identifying the corresponding connected image component of the target image as an added connected image component; (f) for each pair of matching centroids of the original and target images, comparing a pair of sub-images of the original and target images containing connected image components corresponding to the centroids to detect alterations; and (g) generating an alteration map which indicates any deleted or added connected image components identified in steps (d) and (e) and any alterations detected in step (f).

Step (f) in the above method may include: (f1) defining a sub-image of the original image containing the connected image component corresponding to the centroid of the original image; (f2) defining a sub-image of the target image containing the connected image component corresponding to the centroid of the target image; (f3) generating a difference map of the sub-image of the original image and the sub-image of the target image; (f4) generating an edge map from the sub-image of the original image or the sub-image of the target image, the edge map representing an edge area of the connected image components contained in the sub-image; and (f5) modifying the difference map generated in step (f3) by excluding any pixels of the difference map that fall within the edge area of the edge map.

In another aspect, the present invention provides a computer program product comprising a computer usable medium (e.g. memory or storage device) having a computer readable program code embedded therein that causes a data processing apparatus to perform the above methods.

It is to be understood that both the foregoing general description and the following detailed description are exemplary and explanatory and are intended to provide further explanation of the invention as claimed.

DETAILED DESCRIPTION OF PREFERRED EMBODIMENTS

According to embodiments of the present invention, a document alteration detection method compares a scanned digital document image (referred to as the target image herein for convenience) with an original digital document image (referred to as the original image) using a two-step process. In the first step, the original and target images are divided into connected image components and their centroids are obtained, and the centroids of the connected image components in the original and target images are compared. Each centroid in the target image that is not in the original image is deemed to represent an addition (alteration), and each centroid in the original image that is not in the target image is deemed to represent a deletion (alteration). In the second step, sub-images containing the connected image components corresponding to each pair of matching centroids in the original and target images are compared to detect any alterations.

Figure 1:
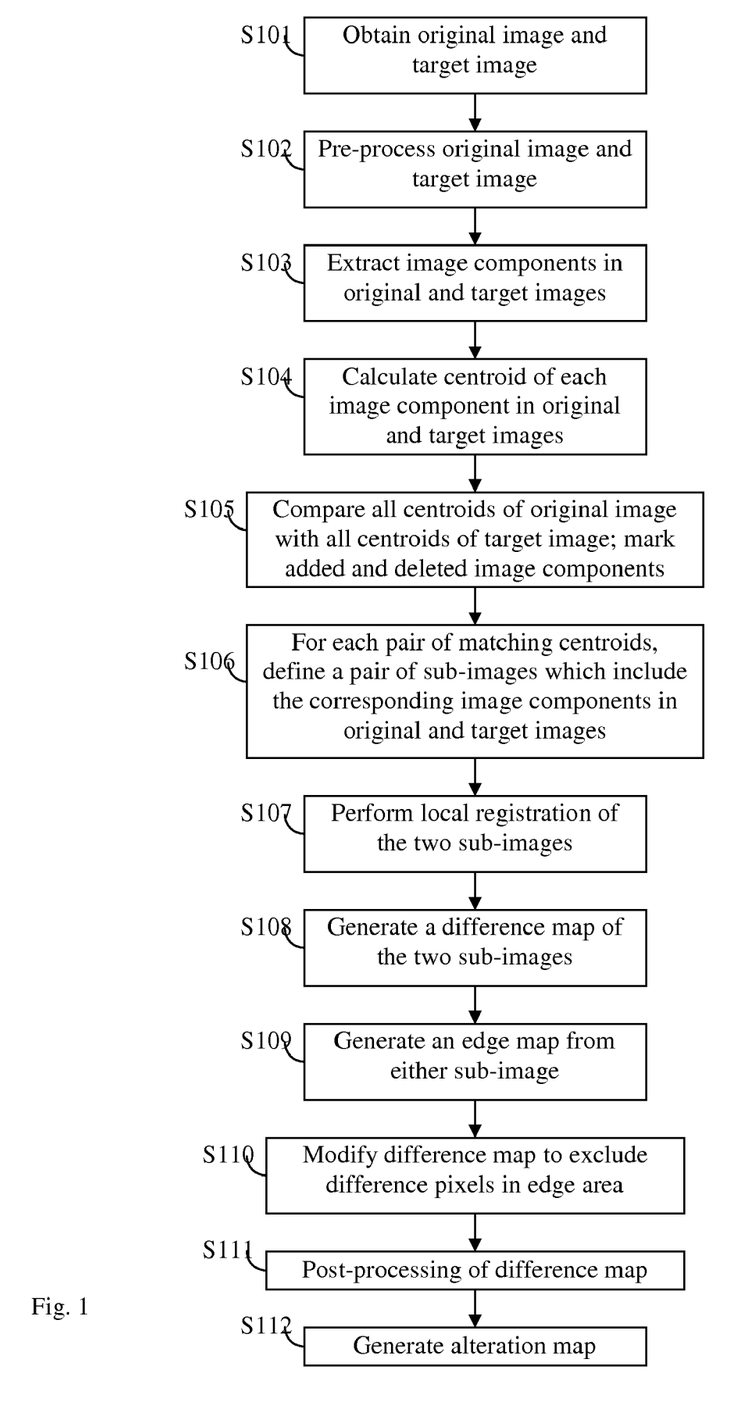
FIG. 1 is a flow chart illustrating an alteration detection method according to an embodiment of the present invention.

The alteration detection method is described in more detail with reference to FIGS. 1 and 2a-2c. FIG. 1 is a flow chart illustrating an alteration detection method according to an embodiment of the present invention. First, the raw original image and the raw target image are obtained (step S101). Both images are bitmap images. Typically, the raw target image is obtained by scanning a hardcopy of a document, which was originally printed from an original digital document. For example, the original digital document may be a document generated by a word processing application by a computer, an image obtained by scanning a hardcopy, a picture taken by a camera, etc. After the original digital document is printed, the hard copy may be circulated, photocopied, etc., before it is scanned back to generate the raw target image. The goal of the authentication or alteration detection process in a certain embodiment is to detect whether the hardcopy document has been altered between the time it was originally printed and the time it was scanned back.

The raw original image obtained in step S101 may be an image generated from the original digital document or it may be the original digital document itself. For example, if the original digital document is a document generated by a word processing application, the raw original image may be obtained by using a computer program that produces an image representing the original digital document. Or, the original digital document may be printed and immediately scanned back without alteration to obtain the raw original image. Or, the raw original image may be obtained by scanning a hardcopy document that is deemed to be an "original". Other ways of obtaining the raw original image may also be used. The raw original image represents an unaltered image of an original document.

It should be noted that in a typical scenario of alteration detection, the raw target image is purported to be a copy of the original document; thus, the raw target image normally has an appearance that generally resemble the original document while the alterations, if present, would be expected to be localized.

The raw original image and raw target image are pre-processed (step S102). Pre-processing includes converting the image from a gray-scale or color image into a binary image by thresholding, if they are not already binary images. The pre-processing steps also include one or more distortion-correction steps, such as deskewing, resizing and registration. Deskew typically refers to correcting a rotational error in the printing and/or scanning process. Many deskew methods are known, such as the Hough transform and Fourier-Mellon transform methods. Some methods use the raw target image only, while others use both the raw target image and the raw original image to perform deskew. Any suitable deskew method may be employed in this step. Similarly, many resizing methods are known. Resizing the raw target image typically requires comparing the raw target image with the raw original image. Some resizing methods compare the effective content areas of the two images. Any suitable resizing method may be employed in this step. Resizing of the raw target image is desirable especially in cases where the raw original and raw target images have different spatial resolutions, such as when the hardcopy document was scanned at a different resolution than the print resolution. The resized raw target image has the same spatial resolution and the same number of pixel as the raw original image, at least in the image area of interest. Registration, which shifts the raw target image, is performed to correctly align the raw target image with respect to the raw original image. It is typically done by comparing the two images. Many image registration methods are known, such as template matching, etc. Any suitable image registration method may be employed in this step.

For the raw original image, the distortion-correction steps may be omitted if the image has not been subject to a print and scan process.

The remaining steps of the alteration detection method compare the processed raw original and raw target images (referred to as the original and target images hereinafter) to detect alterations. First, connected image components in each of the original image and target image are extracted (step S103). In a binary image, connected image components are connected groups of pixels. In a text document, for example, each alphabetic character typically forms one or two connected image components. Many methods for extracting connected image components are known; any suitable method may be employed in this step. Preferably, connected image components made up of a number of pixels smaller than a threshold number are treated as noise and omitted from further analyses. The threshold number depends on the resolution of the images. For example, for a 200 dpi (dots per inch) image, the threshold number may be 20 pixels. For brevity, connected image components may be referred to simply as image components hereinafter.

Figure 2A:
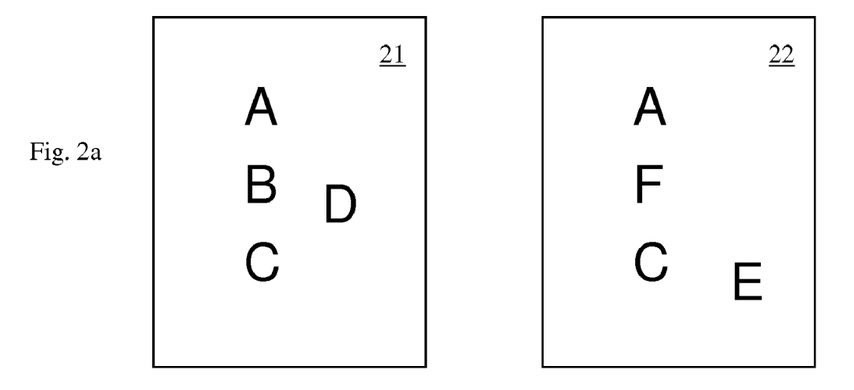
FIG. 2a schematically illustrates an original image and a target image to be compared.

FIG. 2a schematically illustrates an original image 21 and a target image 22 each containing a number of image components. In this example, the original image 21 includes image components "A", "B", "C" and "D", while the target image 22 includes image components "A", "F", "C" and "E" as illustrated.

Figure 2B:
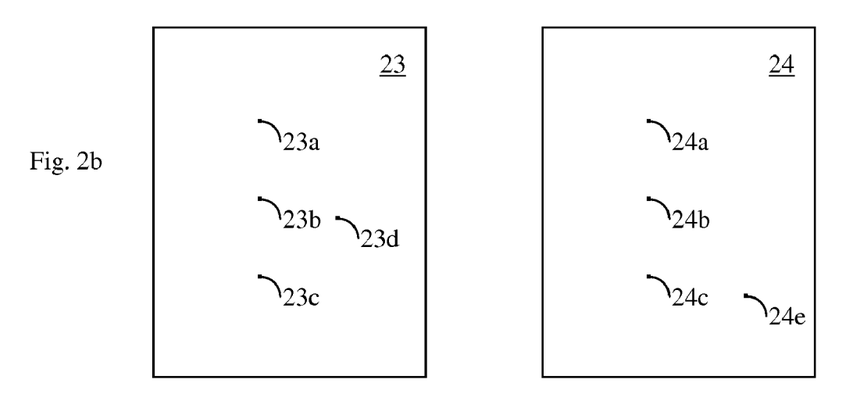
FIG. 2b schematically illustrates the centroids of the original and target images.

Then, for each image component, its centroid (geometric center) is calculated (step S104). FIG. 2b schematically illustrates centroid maps 23 and 24 for the original and target images 21 and 22, respectively. In map 23, centroids 23a-d correspond to image components "A", "B", "C" and "D" in the original image 21, respectively. In map 24, centroids 24a-c and 24e correspond to image components "A", "F", "C" and "E" in the original image 22, respectively.

All centroids extracted from the original image 21 are compared to all centroids extracted from the target image 22 (step S105). In this step, the centroids in the original and target images are compared based on their positions in the images. A pair of centroid in the original and target images having the same location (to within a predetermined positional tolerance) are deemed matching centroids, and all non-matching centroids in the original or target image are deemed to represent alterations. Any centroid in the original image that is not in the target image is considered a deletion, and the image component in the original image corresponding to that centroid is tagged as altered (a deletion). Any centroid in the target image that is not in the original image is considered an addition, and the image component in the target image corresponding to that centroid is tagged as altered (an addition). The positional tolerance depends on the image resolution. For example, for 400 dpi images, the tolerance may be 2 to 3 pixels.

Alternatively, instead of comparing the positions of the centroids in the two images, a form of pattern matching may be performed to identify matching and non-matching centroids in the original and target images.

In the example of FIG. 2b, the centroids 23a, 23c and 24a, 24c are matching centroids, while centroid 23d represents a deletion and centroid 24e represents an addition. As to centroids 23b and 24b, in the case where two different image components occupy substantially the same area in the original and target images, such as the image components "B" and "F" in FIG. 2a, if the positions of the centroids are sufficiently different, the alteration will be treated by the algorithm as a deletion and an addition. On the other hand, if the centroids coincide sufficiently, these image components will be treated as the same image components and the differences will be detected.

The next few steps, steps S106 to S111, are performed for each pair of matching centroids. For each pair of matching centroid, a pair of sub-images are selected in the original image and the target image, respectively, which include the image components corresponding to the centroids (step S106). The sizes of the sub-images are dependent on the sizes of the underlying image components, but they should enclose the entire image components with a suitable margin (e.g. a few pixels). Typically, a bounding box of a suitable size and location has already been developed when extracting the image components in step S103; this bounding box may be used to define the sub-image, with a margin added if desired. A registration step (local registration) may be performed to align the two sub-images of the original and target images relative to each other (step S107). Any suitable method may be used for this step. After registration, the sizes two sub-images in the original and target images are adjusted if necessary so that they have the same size.

Figure 2C:
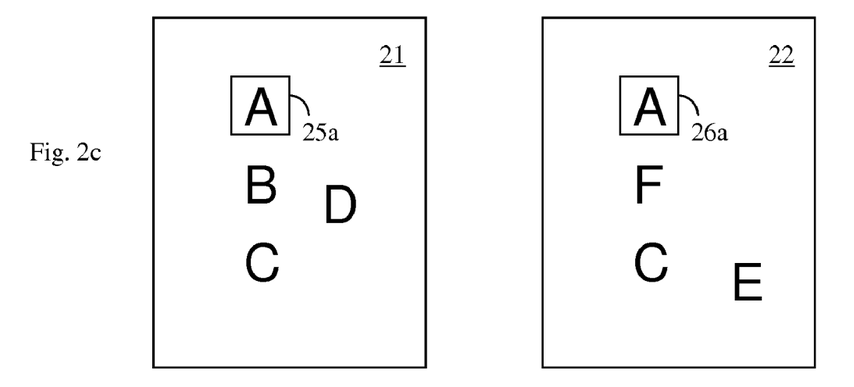
FIG. 2c schematically illustrates two sub-images defined for two centroids in the original and target images.

FIG. 2c schematically illustrates two sub-images 25a, 26a defined for centroids 23a and 24a (not shown in FIG. 2c) including the image components "A" in the original and target images 21 and 22, respectively.

A difference map is then generated for the pair of sub-images (step S108). A difference map of two binary bitmaps is the binary difference ("XOR") of the two bitmaps. The pixel values in the difference map generated in step S108 represent whether the two sub-images are the same or different. An edge map is also generated from either of the two sub-images (step S109). An edge map is a binary map that represents the shape of edges of a connected image component. The pixel values in the edge map represent whether the pixel is in an edge area of the connected image component. Any suitable edge detection (edge extraction) method may be used to generate the edge map, such as Laplacian of Gaussian or Canny edge detectors. Some of such edge detectors generate edges that are approximately one pixel wide. The width of the edges generated by an edge detector may be expanded (e.g. from single pixel to multiple pixels) using morphological dilation. Next, the difference map generated in step S108 is modified to remove any difference pixels that fall in the edge area of the edge map (step S110). Alternatively, in step S109, two edge maps may be generated from the two sub-images, and in step S110, difference pixels are removed if they fall in the edge area of either edge map.

A reason for excluding pixels of the difference map that fall in the edge area is because in the print and scan processes, the widths of image components (such as characters) often become thinner or thicker. Further, the edges of the two image components may differ slightly due to imperfect alignment of the sub-images. Thus, difference pixels in the edge area may represent artifacts due to such factors rather than true alterations.

Post-processing is performed on the modified difference map to de-noise the map (step S111). Any suitable de-noising method may be used, such as morphological operations, etc.

Alternatively, instead of performing de-noising step S111 on each difference map of sub-images, de-noising may be performed on a difference map for the entire image, which is a collection of all the difference maps. As another alternative, de-noising may be performed both on the difference maps of sub-images and the difference map for the entire image.

Figure 3A:
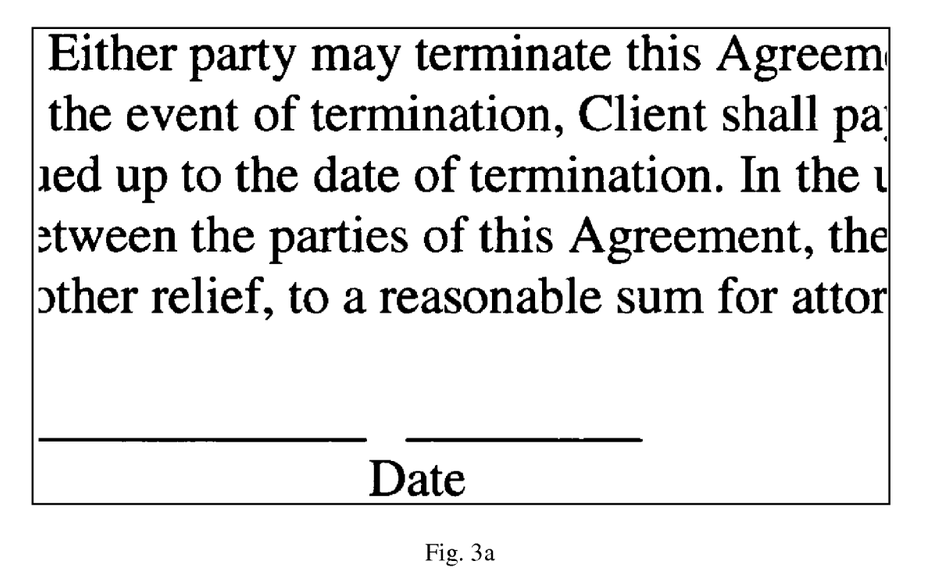
FIGS. 3a-3f illustrate exemplary images at various stages of the alteration detection process.
Figure 3B:
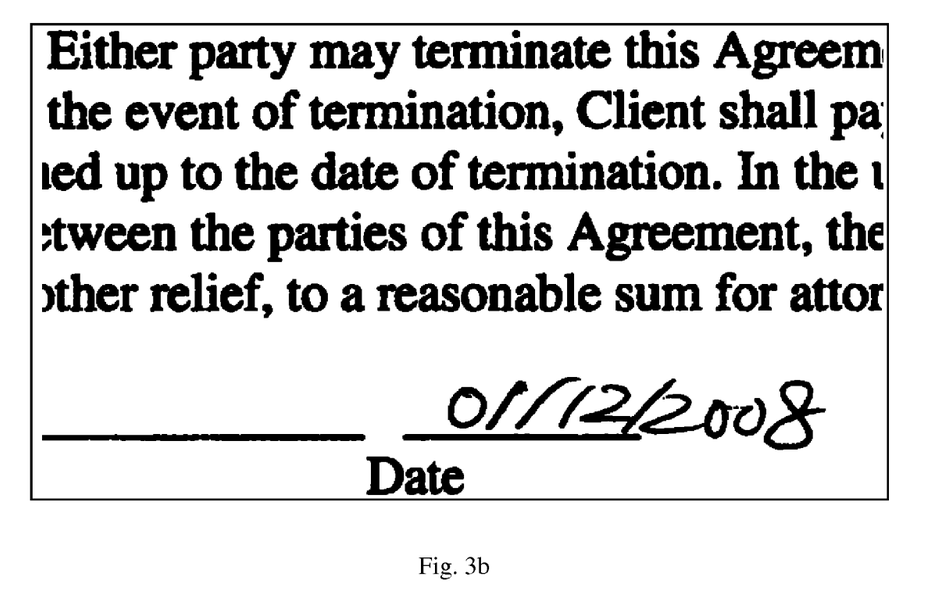
Figure 3C:
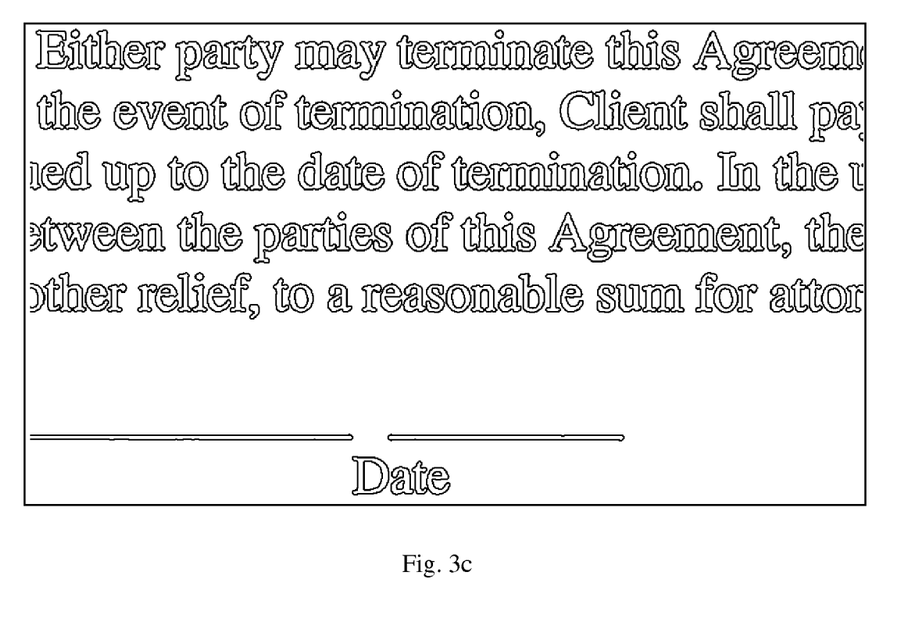
Figure 3D:
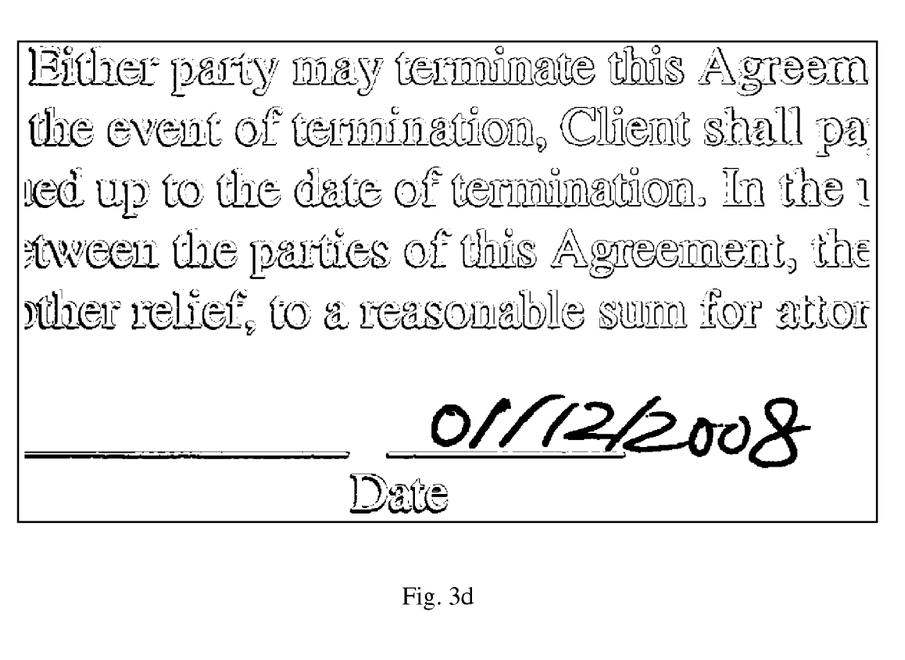
Figure 3E:
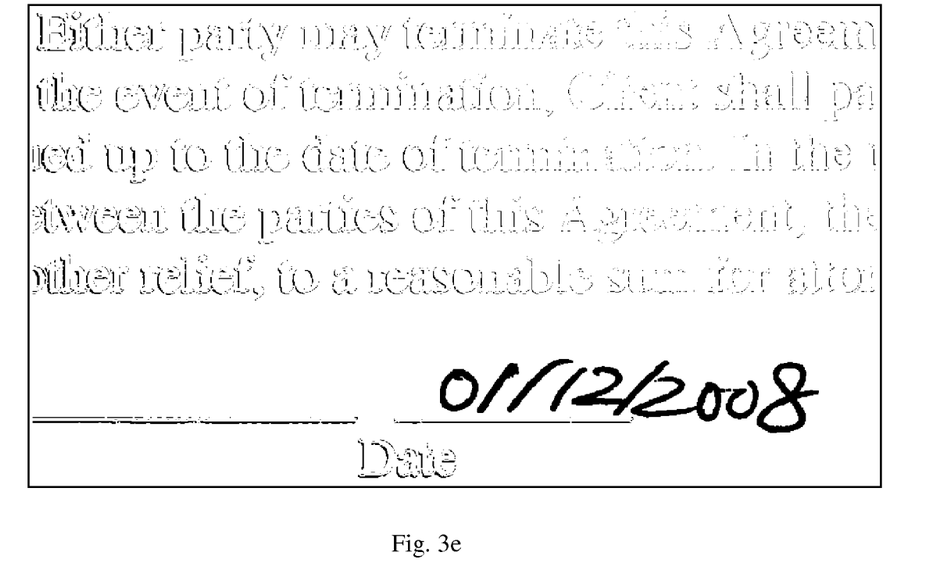
Figure 3F:
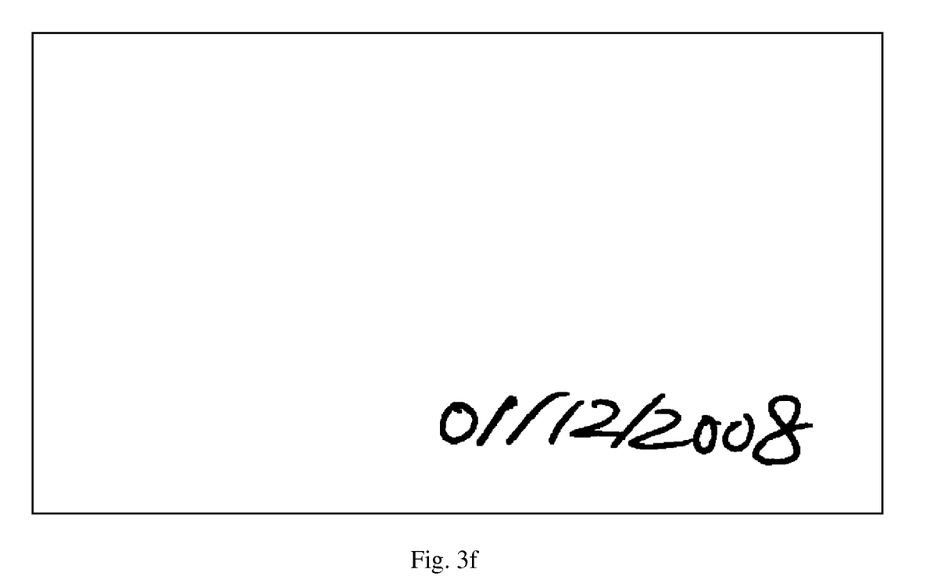

FIGS. 3a-3f illustrate examples of various images in this process. Note that although the actual algorithm processes the image components (e.g. characters) one at a time, in the examples of FIGS. 3a-3f multiple characters are shown together for better visual illustration. FIGS. 3a and 3b show the original and target images (after thesholding), respectively. FIG. 3d shows a difference map generated from the original and target images by step S108. FIG. 3c shows an edge map generated by step S109. In this example, the edge map is generated from the original image. FIG. 3e shows a modified difference map generated by step S110. FIG. 3f shows a modified difference map after the de-noising step S111. The final difference map (FIG. 3f) shows the alteration in the target image.

Steps S106 to S110 (and optionally S111) are repeated for all pairs of matching centroids found in step S105. The modified difference maps generated in step S110 represent the alterations (if any) in the target image within the sub-image areas. Thus, all alteration found in step S105 (additions and deletions) and all alterations found in steps S106-S111 collectively represent the alterations in the target image. An alteration map of the document is generated from these results to indicate the detected alterations (step S112). The alteration map may be printed, displayed on a display device such as a computer monitor, stored in electronic form, etc.

The alteration map may have any suitable format as long as it can indicate the alterations (differences) between the original and target images. For example, the alteration map may be a binary difference map indicating which pixels are different between the two images. In such a map, unaltered areas will be blank, and altered areas will appear on the map. As another example, the alteration map may be a marked-up version of the original image or a marked-up version of the target image, with markers or highlights (such as boxes, circles, lines, arrows, colors, etc.) to indicate parts of the image that are altered (added, deleted, changed, etc.). The added or delete image components may be indicated by a marker with or without showing the image components. Different colors may be used in the alteration map to indicate different types of alterations (additions, deletions, changes, etc.). In another example, the alteration map may include only markers indicating the location of the alterations without including any image components.

The above-described alteration detection method using centroids have many advantages. Dividing the images into many sub-images for image comparison reduces the impact of non-uniform distortion in the scanned image introduced in the printing and scanning process. The positions of centroids are relatively stable in the print and scan process, even when characters become fatter or thinner due to distortions or other artifacts in that process. Thus, by comparing centroids and sub-images around them, local alignment is simplified and computationally less expensive than traditional methods. In addition, portions of the image where no content is present are automatically skipped. These significantly speed up the detection process.

The alteration detection method described above may be implemented by software or firmware stored in a memory and executed by any suitable data processing apparatus, such as a computer, a printer or scanner having a data processing section, etc. In this regard, computer executable software, which is codes for realizing the flowchart of FIG. 1, may be stored in a computer memory accessed by a central processing unit (CPU) or a micro processing unit (MPU) of the suitable data processing apparatus. The printing and scanning steps may be performed by any printer and scanner, or an all-in-one device that combines a printing section and scanning section in a single device. The structures of these devices and apparatuses are well known and not described in detail here.

It will be apparent to those skilled in the art that various modification and variations can be made in the alteration detection method and apparatus of the present invention without departing from the spirit or scope of the invention. Thus, it is intended that the present invention cover modifications and variations that come within the scope of the appended claims and their equivalents.

What is claimed is:

1. A method implemented in a data processing apparatus for detecting alterations between an original image and a target image, the original and target images being binary bitmap images, the method comprising:
   (a) extracting connected image components from the original and target images;
   (b) calculating a centroid for each of the extracted connected image components in the original and target images;
   (c) comparing all centroids of the original image and all centroids of the target image to determine whether each centroid of the original image has a matching centroid of the target image, and whether each centroid of the target image has a matching centroid of the original image;
   (d) for each centroid of the original image that does not have a matching centroid in the target image, identifying the corresponding connected image component of the original image as a deleted connected image component;
   (e) for each centroid of the target image that does not have a matching centroid in the original image, identifying the corresponding connected image component of the target image as an added connected image component;
   (f) for each pair of matching centroids of the original and target images, comparing a pair of sub-images of the original and target images containing connected image components corresponding to the centroids to detect alterations; and
   (g) generating an alteration map which indicates any deleted or added connected image components identified in steps (d) and (e) and any alterations detected in step (f).

2. The method of claim 1, wherein step (f) includes:
   (f1) defining a sub-image of the original image containing the connected image component corresponding to the centroid of the original image;
   (f2) defining a sub-image of the target image containing the connected image component corresponding to the centroid of the target image;
   (f3) generating a difference map of the sub-image of the original image and the sub-image of the target image;
   (f4) generating an edge map from the sub-image of the original image or the sub-image of the target image, the edge map representing an edge area of the connected image components contained in the sub-image; and
   (f5) modifying the difference map generated in step (f3) by excluding any pixels of the difference map that fall within the edge area of the edge map.

3. The method of claim 2, wherein step (f) further includes, after steps (f1) and (f2) and before step (f3):
   (f6) aligning the sub-image of the original image and the sub-image of the target image relative to each other.

4. The method of claim 2, wherein step (f) further includes, after step (f5):
   (f7) de-noising the modified difference map obtained in step (f5).

5. The method of claim 1, wherein step (c) includes comparing the positions of the centroids in of the original image and the target image, wherein a centroid of the original image and a centroid of the target image are determined to be matching centroids if their positions are identical to within a predetermined positional tolerance.

6. The method of claim 1, wherein step (c) includes comparing a pattern of centroids of the original image with a pattern of centroids of the target image.

7. The method of claim 1, further comprising, before step (a):
   (h) pre-processing the target image, including one or more steps of deskewing, resizing and image registration.

8. The method of claim 1, wherein the alteration map comprises a difference map.

9. The method of claim 1, wherein the alteration map comprises the original image or the target image and one or more markers indicating the alterations.

10. The method of claim 1, further comprising:
    (i) printing the alteration map or displaying the alteration map on a display device.

11. A computer program product comprising a non-transitory computer readable storage medium having a computer readable program code embedded therein for controlling a data processing apparatus, the computer readable program code configured to cause the data processing apparatus to execute a process for detecting alterations between an original image and a target image, the original and target images being binary bitmap images, the process comprising:
    (a) extracting connected image components from the original and target images;
    (b) calculating a centroid for each of the extracted connected image components in the original and target images;
    (c) comparing all centroids of the original image and all centroids of the target image to determine whether each centroid of the original image has a matching centroid of the target image, and whether each centroid of the target image has a matching centroid of the original image;
    (d) for each centroid of the original image that does not have a matching centroid in the target image, identifying the corresponding connected image component of the original image as a deleted connected image component;
    (e) for each centroid of the target image that does not have a matching centroid in the original image, identifying the corresponding connected image component of the target image as an added connected image component;
    (f) for each pair of matching centroids of the original and target images, comparing a pair of sub-images of the original and target images containing connected image components corresponding to the centroids to detect alterations; and
    (g) generating an alteration map which indicates any deleted or added connected image components identified in steps (d) and (e) and any alterations detected in step (f).

12. The computer program product of claim 11, wherein step (f) includes:
    (f1) defining a sub-image of the original image containing the connected image component corresponding to the centroid of the original image;

(f2) defining a sub-image of the target image containing the connected image component corresponding to the centroid of the target image;

(f3) generating a difference map of the sub-image of the original image and the sub-image of the target image;

(f4) generating an edge map from the sub-image of the original image or the sub-image of the target image, the edge map representing an edge area of the connected image components contained in the sub-image; and (f5) modifying the difference map generated in step (f3) by excluding any pixels of the difference map that fall within the edge area of the edge map.

13. The computer program product of claim 12, wherein step (f) further includes, after steps (f1) and (f2) and before step (f3):

(f6) aligning the sub-image of the original image and the sub-image of the target image relative to each other.

14. The computer program product of claim 13, wherein step (f) further includes, after step (f5):

(f7) de-noising the modified difference map obtained in step (f5).

15. The computer program product of claim 11, wherein step (c) includes comparing the positions of the centroids in of the original image and the target image, wherein a centroid of the original image and a centroid of the target image are determined to be matching centroids if their positions are identical to within a predetermined positional tolerance.

16. The computer program product of claim 11, wherein step (c) includes comparing a pattern of centroids of the original image with a pattern of centroids of the target image.

17. The computer program product of claim 11, further comprising, before step (a):

(h) pre-processing the target image, including one or more steps of deskewing, resizing and image registration.

18. The computer program product of claim 11, wherein the alteration map comprises a difference map.

19. The computer program product of claim 11, wherein the alteration map comprises the original image or the target image and one or more markers indicating the alterations.

20. The computer program product of claim 11, wherein the process further comprises:

(i) printing the alteration map or displaying the alteration map on a display device.

\* \* \* \* \*